United States Patent [19]

Lutter et al.

[11] Patent Number: 5,420,170
[45] Date of Patent: * May 30, 1995

[54] PREPARATION OF FLEXIBLE, SOFT POLYURETHANE FOAMS HAVING VISCOELASTIC, STRUCTURE-BORNE SOUNDPROOFING PROPERTIES, AND POLYOXYALKYLENE-POLYOL MIXTURES WHICH CAN BE USED FOR THIS PURPOSE

[75] Inventors: Heinz-Dieter Lutter, Neckargemuend; Reinhard Leppkes, Bobenheim-Roxheim; Peter Horn, Heidelberg; Walter Decker, Ludwigshafen; Volker Haase, Adelzhausen; Werner Hinz, Frankenthal, all of Germany

[73] Assignee: BASF Aktiengesellschaft, Germany

[*] Notice: The portion of the term of this patent subsequent to Oct. 22, 2008 has been disclaimed.

[21] Appl. No.: 619,265

[22] Filed: Nov. 28, 1990

[30] Foreign Application Priority Data

Dec. 21, 1989 [DE] Germany .................. 39 42 330.1

[51] Int. Cl.$^6$ .............................................. C08G 18/14
[52] U.S. Cl. .................... 521/159; 521/129; 521/137; 521/160; 521/164; 521/173; 521/174; 521/176; 521/914; 252/182.24; 252/182.25; 252/182.27
[58] Field of Search ............ 521/164, 129, 160, 176, 521/914, 137, 159, 173, 174; 252/182.24, 182.25, 182.27

[56] References Cited

U.S. PATENT DOCUMENTS

| | | | |
|---|---|---|---|
| 4,241,806 | 12/1980 | Metzger | 428/117 |
| 4,324,831 | 4/1982 | Parrini et al. | 428/288 |
| 4,710,521 | 12/1987 | Soukup et al. | 521/164 |
| 4,839,397 | 6/1989 | Lohmar et al. | 521/159 |
| 4,987,156 | 1/1991 | Tozune et al. | 521/129 |
| 5,059,632 | 10/1991 | Horn et al. | 521/137 |
| 5,059,633 | 10/1991 | Lutter et al. | 521/160 |
| 5,063,253 | 11/1991 | Gansen et al. | 521/159 |

FOREIGN PATENT DOCUMENTS 3838030 10/1990 Germany.

*Primary Examiner*—Samuel A. Acquah
*Assistant Examiner*—John M. Cooney, Jr.
*Attorney, Agent, or Firm*—Dennis V. Carmen

[57] ABSTRACT

The present invention relates to a process for the preparation of flexible, soft polyurethane foams having viscoelastic, structure-borne soundproofing properties in a temperature range of from −20° C. to +80° C. by reacting a) a polyoxyalkylene-polyol mixture containing
  ai) block polyoxypropylene-polyoxyethylene-polyol mixture having a hydroxyl number of from 14 to 65 and containing from 2 to 9% by weight of terminal ethylene oxide units, based on the weight of the polyoxypropylene units, prepared by anionic polymerization, at elevated temperatures, of 1,2-propyleneoxide onto an initiator molecule mixture having a mean functionality of from 2.3 to 2.8, comprising water and glycerol and/or trimethylolpropane, and polymerization of acylene oxide onto the resultant polyoxypropylene adduct, and
  aii) one or more difunctional and/or trifunctional polyoxypropylene-polyoxyethylene-polyol containing from 60 to 85% by weight of oxyethylene units, based on the total weight of polymerized alkylene oxide units, and having a hydroxyl number of from 20 to 80, and
b) if desired low-molecular-weight chain extenders with
c) organic and/or modified organic polyisocyanates in the presence of
d) catalysts,
e) blowing agents, preferably water, and, if desired,
f) auxiliaries and/or additives, and to the polyoxyalkylene-polyol mixtures (a) which can be used for this purpose.

19 Claims, No Drawings

PREPARATION OF FLEXIBLE, SOFT POLYURETHANE FOAMS HAVING VISCOELASTIC, STRUCTURE-BORNE SOUNDPROOFING PROPERTIES, AND POLYOXYALKYLENE-POLYOL MIXTURES WHICH CAN BE USED FOR THIS PURPOSE

The present invention relates to a process for the preparation of flexible, soft polyurethane foams (abbreviated to soft PU foams below) having viscoelastic, structure-borne soundproofing properties in a temperature range of from −20° C. to +80° C., by reacting
  a) a polyoxyalkylene-polyol mixture containing
    ai) specific block polyoxypropylene-polyoxyethylene-polyol mixtures having a hydroxyl number of from 14 to 65 and containing from 2 to 9% by weight of terminal ethylene oxide units, which are themselves obtained using an initiator molecule mixture having a mean functionality of from 2.3 to 2.8, comprising water and glycerol or trimethylolpropane or comprising water, glycerol and trimethylolpropane, and
    aii) one or more difunctional and/or trifunctional polyoxypropylene-polyoxyethylene-polyol containing from 60 to 85% by weight of oxyethylene units, based on the total weight of polymerized alkylene oxide units, and a hydroxyl number of from 20 to 80, and
  b) if desired low-molecular-weight chain extenders with
  c) organic and/or modified organic polyisocyanates in the presence of catalysts (d), blowing agents (e), auxiliaries and/or additives (f), and to the polyoxyalkylene-polyol mixtures (a) which can be used for this purpose.

The preparation of soft PU foams by reacting relatively high-molecular-weight polyhydroxyl compounds and, if desired, chain extenders with organic polyisocyanates is known and has been described in numerous patents and literature publications.

Specific examples are Kunststoff-Handbuch, Volume VII, Polyurethane, Carl Hanser Verlag, Munich, 1st Edition, 1966, edited by Dr. R. Vieweg and Dr. A. Höchtlen, and 2nd edition, 1983, edited by Dr. G. Oertel.

The following are usually used for the preparation of soft PU foams: the relatively high-molecularweight polyhydroxyl compounds are polyester-polyols and/or polyoxyalkylene-polyols based on 1,2-propylene oxide, ethylene oxide or mixtures of these alkylene oxides, and mixtures of polyoxyalkylene-polyols of this type and graft polyoxyalkylene-polyols, the chain extenders are alkanediols, oxyalkylene glycols or hydroxyl-and/or amino-containing, low-molecular-weight compounds having a functionality of from 2 to 4, eg. glycerol, trimethylolpropane or alkanolamines, and the organic polyisocyanates are commercially available tolylene diisocyanates (TDI), mixtures of diphenylmethane diisocyanates and polyphenyl-polymethylene polyisocyanates (crude MDI) having a diphenylmethane diisocyanate (MDI) isomer content of 35% by weight or more, and mixtures of crude MDI and TDI.

A suitable choice of the synthesis components and their mixing ratios allows soft PU foams having very good mechanical properties to be obtained.

According to DE-C-1,520,737 (U.S. Pat. No. 3,336,242), PU foams having an open cell structure can be prepared by a one-step process by reacting polyisocyanates with polyoxypropylene-polyoxyethylene-triols having molecular weights of from 3000 to 8000 and containing as an endblock from 3 to 5% by weight of ethylene oxide and containing as an initiator molecule glycerol in bound form.

According to GB-A-1,079,105, very soft PU foams are obtained from a polyether-polyol or a polyether-polyol mixture having a hydroxyl number of from 70 to 170 which contains a trifunctional polyoxyalkylene-polyol, for example oxypropylated glycerol, and up to 40% by weight of a polyoxyalkylene glycol, for example oxypropylated ethylene glycol, and an organic polyisocyanate, preferably TDI, in the presence of water and a fluorochlorohydrocarbon, preferably trichlorofluoromethane, as blowing agent.

In order to reduce the noise level of machines or vehicles, light, very easily processed materials and panelling elements having structure-borne soundproofing properties are in demand.

Porous polyurethanes are known and in use as a material which satisfies these requirements to a certain extent. PU foams are particularly suitable for mass production. Due to their simple preparation, PU foam moldings are particularly suitable for optimization of acoustics in means of transport.

However, the properties of the sound absorber polyurethane are also unsatisfactory in several respects:

For example, the absorption of acoustic energy in rigid absorbers takes place through the friction of air in the cavities. If soundproofing is required at low temperatures, it is necessary to use PU absorbers in thick layers, which is in many cases not possible for economic reasons and due to the design geometry in vehicle construction.

PU foams having relaxation behavior, known as viscoelastic PU foams, act preferentially due to their matrix structure. Soundwaves set the polyurethane structure in vibration, high damping and a high modulus of elasticity of the PU foam being required. The damping is characterized by the loss factor $\eta$, which is described by the equation $$\eta = \frac{W_v}{2\pi \cdot W_r}$$

in which:
  Wv is the vibrational energy converted irreversibly into heat during a vibrational period and
  Wr is the reversible vibrational energy.

The loss factor $\eta$ thus represents the ratio between the vibrational energy converted irreversibly into heat during a vibrational period and the reversible vibrational energy. Good soundproofing requires a loss factor of 0.3 or more over as broad a frequency range as possible.

In order to increase the loss factor of PU foams, various methods are known from the prior art.

According to DE-B-2,756,622 (U.S. Pat. No. 4,374,172), sheets or strips of sound-insulating material comprising an open-cell foam, for example PU foam, are impregnated over the entire area with various amounts of a visco-elastic composition, for example a polyolefin, an organic resin or a wax, containing inorganic fillers, such as chalk, slate powder or barytes. This method has the disadvantage of the complex impregnation process.

In DE-A-3,522,868 (U.S. Pat. No. 4,605,681), a duroplastic PU material having high, temperature-sensitive damping is prepared from conventional starting materials for PU foams, but in the presence of polybutadienes containing terminal hydroxyl groups in order to increase the loss factor. Due to the high susceptibility of the incorporated polybutadienes to autoxidation, cellular or noncellular PU materials of this type undergo undesired changes in mechanical properties in air.

In addition, DE-C-3,313,624 (GB 2,138,012) discloses soft PU foams for sound-protection purposes having a density of less than 90 kg/m$^3$, a modulus of elasticity of less than $10^5$ N/mm and a loss factor of 0.3 or more with viscoelastic properties in a temperature range of from $-20°$ to $+80°$ C., prepared from organic polyisocyanates or polyisocyanate prepolymers and a polyol mixture comprising polyether triols having a molecular weight of from 4000 to 6500 and 15% by weight or more, based on the polyol mixture, of a polyoxypropylene triol having a hydroxyl number of from 180 to 400. These restrictions limit the freedom for designing the mechanical property profile of the PU foams so greatly that the technical teaching can in numerous cases not be applied.

Soft PU foams having sound-insulating and antidrone properties and a density of from 80 to 250 kg/m$^3$, a modulus of elasticity of less than 300,000 N/mm and a loss factor of 0.4 or more, and an adhesive surface are prepared, according to DE-A-3,710,731, by reacting a polyisocyanate or polyisocyanate prepolymer with an excess of polyols or mixtures thereof while maintaining an NCO index of less than or equal to 80 by the RIM method. Suitable polyols mentioned are polyether polyols.

Cold-curing soft PU foam moldings having good damping properties are obtained according to EP-A-0,331,941 by reacting polyisocyanates with
i) one or more polyether containing two or more OH groups and having an OH number of from 20 to 60, based on from 75 to 95% by weight of 1,2-propylene oxide and from 5 to 25% by weight of ethylene oxide,
ii) a polyether or polyester containing two or more OH groups and having an OH number of from 150 to 400, and
iii) a polyether or polyester containing two or more OH groups and having an OH number of from 20 to 200, based on 1,2-propylene oxide and ethylene oxide with an ethylene oxide content of greater than 50% by weight, based on 1,2-propylene oxide and ethylene oxide, in the presence of water and, if desired, organic blowing agents, catalysts and, if desired, auxiliaries and additives.

Although soft PU foams which have satisfactory viscoelastic properties and are characterized by the modulus of elasticity and the loss factor can he prepared by the processes mentioned as examples, these foams are also in need of improvement, in particular with respect to the various areas of application.

It is an object of the present invention to prepare flexible, soft PU foams having viscoelastic properties which are distinguished by a low modulus of elasticity with, at the same time, an extremely high loss factor and are particularly suitable for the production of structure-borne sound-absorbent moldings. During foaming, the use of fluorochlorohydrocarbons, which are suspected of damaging the ozone layer, as blowing agents should he completely or at least substantially avoided, without adversely affecting the mechanical properties of the resultant foams. The organic polyisocyanates used should preferably he low-volatility, modified or unmodified MDI isomers or crude MDI.

We have found, surprisingly, that this object can be achieved by using a polyoxyalkylene-polyol mixture of specially structured polyoxypropylene-polyoxyethylene-polyols as the relatively high-molecular-weight compound containing two or more reactive hydrogen atoms for the preparation of the flexible, soft PU foams.

Accordingly, the invention provides a process for the preparation of flexible, soft polyurethane foams having viscoelastic, structure-borne soundproofing properties in a temperature range of from $-20°$ C. to $+80°$ C., by reacting
a) polyoxyalkylene-polyols which have a functionality of two or more and
b) if desired low-molecular-weight chain extenders with
c) organic and/or modified organic polyisocyanates, in the presence of
d) catalysts
e) blowing agents and, if desired
f) auxiliaries and/or additives, which comprises using, as the polyoxyalkylene-polyols
(a), a mixture which contains or preferably comprises
  ai) a block polyoxypropylene-polyoxyethylene-polyol mixture having a hydroxyl number of from 14 to 65 and containing from 2 to 9% by weight of terminal ethylene oxide units, based on the weight of the polyoxypropylene units, and prepared by anionic polymerization at elevated temperature of 1,2-propylene oxide onto an initiator molecule mixture, having a mean functionality of from 2.3 to 2.8, of water and glycerol and/or trimethylolpropane and polymerization of ethylene oxide on the resultant polyoxypropylene adduct, and
  aii) one or more difunctional and/or trifunctional polyoxypropylene-polyoxyethylene-polyol containing from 60 to 85% by weight of oxyethylene units, based on the total weight of polymerized alkylene oxide units, and having a hydroxyl number of from 20 to 80.

According to a preferred embodiment, the flexible, soft PU foams having viscoelastic, structureborne soundproofing properties in a temperature range of from $-20°$ to $+80°$ C. are prepared by a multistep process which comprises
1. in the first reaction step, polymerizing 1,2-propylene oxide onto an initiator molecule mixture, having a mean functionality of from 2.3 to 2.8, of water and glycerol and/or trimethylolpropane in the presence of one or more basic catalyst at elevated temperature and polymerizing ethylene oxide onto the resultant polyoxypropylene adduct in such an amount that the resultant block polyoxypropylene-polyoxy-ethylene-polyol mixture (ai) has a hydroxyl number of from 14 to 65 and contains from 2 to 9% by weight of terminal ethylene oxide units, based on the weight of the polyoxypropylene units,
2. in the second reaction step,
  ai) mixing the resultant block polyoxypropylene-polyoxyethylene-polyol mixture (ai) with
  aii) one or more difunctional and/or trifunctional polyoxypropylene-polyoxyethylene-polyol containing from 60 to 85% by weight of oxyethylene units, based on the total weight of polymerized alkylene oxide units, and having a hydroxyl number of from 20 to 80, and b) if desired, low-molecular-weight chain extenders, and 3. in a third reaction step, reacting the resultant mixture with c) one or more organic and/or modified organic polyisocyanate in the presence of d) catalysts, e) blowing agents and, if desired, f) auxiliaries and/or additives.

Expedient and therefore preferred embodiments of the process according to the invention are the subject-matters of claims 3 to 10.

The present invention also relates to novel polyoxyalkylene-polyol mixtures which contain or preferably comprise, based on the total weight, ai) from 10 to 40% by weight of a block polyoxypropylene-polyoxyethylene-polyol mixture having a hydroxyl number of from 14 to 40 and containing from 3 to 8% by weight of terminal ethylene oxide units, based on the weight of the polyoxypropylene units, prepared by anionic polymerization, at elevated temperature, of 1,2-propylene-oxide on an initiator molecule mixture, having a mean functionality of from 2.3 to 2.8, of water and glycerol and polymerization of ethylene oxide on the resultant polyoxypropylene adduct, and aii) from 60 to 90% by weight of one or more difunctional and/or trifunctional polyoxypropylene-polyoxyethylene-polyol containing from 60 to 85% by weight of oxyethylene units and having a hydroxyl number of from 20 to 80, the percentages by weight being based on the total weight of polymerized alkylene oxide units.

Since the preferred use of water for the formation of carbon dioxide as blowing agent results, in the reaction with the organic polyisocyanates, in the formation of urea groups, which increase the compressive strength of the resultant PU foam, it was surprising and could not have been predicted that the use of the novel polyoxyalkylene-polyol mixture would not only compensate for this behavior, but would also give soft PU foams having low compressive strength and simultaneously very good viscoelastic properties, in particular a higher loss factor, and are furthermore distinguished by other good mechanical properties, eg. tensile strength, elongation, tear propagation strength and compressive set.

The following details apply to the preparation of the novel polyoxyalkylene-polyol mixtures (a) which can be used according to the invention, in particular to the block polyoxypropylene-polyoxyethylene-polyol mixtures (ai) which are suitable for this purpose and to the other starting components which can be used for the process according to the invention:

a) The polyoxyalkylene-polyols which have a functionality of two or more are polyoxyalkylene-polyol mixtures (a) which contain or preferably comprise ai) a block polyoxypropylene-polyoxyethylene-polyol mixture having a hydroxyl number of from 14 to 65, preferably from 14 to 40, in particular from 20 to 35, and containing from 2 to 9% by weight, preferably from 3 to 8% by weight, in particular from 5 to 7% by weight, of terminal ethylene oxide units, based on the weight of the polyoxypropylene units, and prepared by anionic polymerization, at elevated temperature, of 1,2-propylene-oxide onto an initiator molecule mixture having a mean functionality of from 2.3 to 2.8, preferably from 2.3 to 2.7, in particular from 2.5 to 2.7, of water and glycerol and/or trimethylolpropane, and polymerization of ethylene oxide onto the resultant polyoxypropylene adduct, and aii) one or more difunctional and/or preferably trifunctional polyoxypropylene-polyoxyethylene-polyol containing from 60 to 85% by weight, preferably from 70 to 80% by weight, in particular from 73 to 78% by weight, of oxyethylene units, based on the total weight of polymerized alkylene oxide units, and having a hydroxyl number of from 20 to 80, preferably from 25 to 60, in particular from 25 to 45, from 0 to 20% by weight, preferably from 2 to 15% by weight, in particular from 3 to 8% by weight, of the oxyethylene units mentioned being bound in the terminal position.

Polyoxyalkylene-polyol mixtures (a) which contain or preferably comprise, based on the weight of (ai) and (aii), (ai) from 10 to 90% by weight, preferably from 10 to 40% by weight, in particular from 12 to 30% by weight, of the block polyoxypropylene-polyoxyethylene-polyol mixture (ai) and (aii) from 10 to 90% by weight, preferably from 60 to 90% by weight, in particular from 70 to 88% by weight, of the difunctional and/or trifunctional polyoxypropylene-polyoxyethylene-polyol (aii) containing from 60 to 85% by weight of oxyethylene units, based on the total weight of polymerized 1,2-propylene oxide units and ethylene oxide units, have proven particularly successful and are therefore expediently used.

As stated above, the block polyoxypropylene-polyoxyethylene-polyol mixtures (ai) which are suitable according to the invention have a hydroxyl number of up to 65 and contain from 2 to 9% by weight of terminal ethylene oxide units, based on the weight of the polyoxypropylene units. An increase in the hydroxyl number to above 65, like an increase in the ethylene oxide content in the end block to values of greater than 10% by weight, would result in increasing hardening of the soft PU foams, together with an increase in the compressive strength. If, by contrast, the ethylene oxide content is reduced to less than 2% by weight or if polyoxypropylene-polyols are used, the reactivity of the polyoxyalkylene-polyols is greatly reduced and their sensitivity is at the same time considerably increased, so that comparatively easy processing of the soft PU foam systems produced therefrom is only possible in narrow reaction ranges.

The initiator molecules used for the preparation of the block polyoxypropylene-polyoxyethylene-polyol mixtures (ai) are mixtures of water and trimethylolpropane or glycerol, of water, trimethylolpropane and glycerol, and preferably of water and glycerol. The water and glycerol and/or trimethylolpropane are preferably used in the molar ratio from 2.3:1 to 1:4, preferably from 2:1 to 1:2.5, in particular from 151 to 1:2.5, the total amount of the mixture of glycerol and trimethylolpropane corresponding to the molar ratio of an alkanetriol. If the initiator molecule mixture which is suitable according to the invention is replaced as initiator by a trihydric alcohol, soft PU foams having increased compressive strength are obtained.

The block polyoxypropylene-polyoxyethylenepolyol mixtures (ai) are expediently prepared by anionic polymerization of 1,2-propylene oxide onto the initiator molecule mixture and subsequent polymerization of ethylene oxide onto the resultant polyoxypropylene adduct in the presence of basic catalysts at elevated temperatures and atmospheric pressure or superatmospheric pressure. Specific examples of suitable catalysts are alkali metal hydroxides, for example sodium hydroxide or preferably potassium hydroxide, and alkali metal alcoholates, such as sodium methylate, sodium ethylate, potassium ethylate or potassium isopropylate. To prepare the block polyoxypropylene-polyoxyethylene-polyol mixtures (ai), the glycerol and/or trimethylolpropane are first converted into the corresponding alcoholates. Depending on the nature of the catalyst used, some of the water formed during the reaction or all of the low-boiling alcohol formed is removed by distillation. According to a preferred embodiment, the trimethylolpropane and/or preferably the glycerol is first converted into the alcoholate with removal of all of the water or low-boiling alcohol formed. An aqueous alkali metal hydroxide solution is then introduced into the alcoholate formed in the amount necessary to establish the required functionality of the initiator molecule mixture. The 1,2-propylene oxide is then introduced at the rate at which it reacts at from 90 to 150° C., preferably from 100° to 130° C., and under atmospheric pressure or under superatmospheric pressure of from 1.1 to 20 bar, preferably from 1.1 to 7 bar. When the propoxylation is complete, the terminal ethylene oxide block can be polymerized on directly using ethylene oxide. However, in the preparation process preferably used, all the unreacted 1,2-propylene oxide is removed by distillation under reduced pressure when the propoxylation is complete and the ethoxylation is then carried out under the abovementioned reaction conditions. Depending on the temperature and pressure conditions selected, reaction times of from 4 to 30 hours, preferably from 6 to 10 hours, are necessary for the propoxylation and ethoxylation reactions. When the ethoxylation is complete, any excess, unreacted ethylene oxide is removed under reduced pressure at from 100° to 150° C.

The alkali metal-containing block polyoxypropylene-polyoxyethylene-polyol mixtures can be neutralized, for example by adding inorganic acids, eg. sulfuric acid, phosphoric acid or carbonic acid, organic acids, eg. citric acid, acetic acid, formic acid etc., or ion exchanger resins, and purified, if necessary, by known methods by adding adsorbents.

Suitable difunctional and/or preferably trifunctional polyoxypropylene-polyoxyethylene-polyols (aii), which contain predominantly oxyethylene units in bound form, can be prepared from 1,2-propylene oxide and ethylene oxide by conventional processes, for example by the above-described anionic polymerization in the presence of basic catalysts and using difunctional and/or trifunctional initiator molecules.

Examples of suitable initiator molecules are water, organic dicarboxylic acids, eg. succinic acid, glutaric acid, adipic acid, phthalic acid and terephthalic acid, alkanolamines, eg. ethanolamine, dialkanolamines, eg. diethanolamine and diisopropanolamine, N-alkyldialkanolamines, eg. N-methyl- and N-ethyldiethanolamine, trialkanolamine, such as triethanolamine and triisopropanolamine, and ammonia. Preference is given to dihydric and in particular trihydric alcohols, alkylene glycols and mixtures thereof, eg. ethanediol, 1,2-propanediol, 1,3-propanediol, diethylene glycol, dipropylene glycol, 1,4-butanediol, 1,6-hexanediol, trimethylolpropane and in particular glycerol.

The polyoxypropylene-polyoxyethylene-polyols can be used individually or in the form of mixtures, it being possible for the internal alkylene-oxide units to be arranged either randomly or blockwise. However, particular preference is given to polyoxypropylene-polyoxyethylene-polyols containing from 0 to 20% by weight, preferably from 2 to 15% by weight, in particular from 3 to 8% by weight, of ethylene oxide, based on the total weight of the alkylene oxides, in the end block, and containing more than 50%, preferably more than 60% of primary hydroxyl groups. Polyoxyalkylene-polyols of the type mentioned are described, for example, in DE-C-1,520,737 (U.S. Pat. No. 3,336,242) and DE-A-1,570,885 (GB-A-1,120,223).

Polyoxyalkylene-polyol mixtures (a) which, based on the total weight, comprise ai) from 10to 40% by weight of a block polyoxypropylene-polyoxyethylene-polyol mixture having a hydroxyl number of from 14 to 40 and containing from 3 to 8% by weight of terminal ethylene oxide units, based on the weight of the polyoxypropylene units, and prepared by anionic polymerization, at elevated temperature, of 1,2-propylene oxide onto an initiator molecule mixture, having a mean functionality of from 2.3 to 2.7, of water and glycerol, and polymerization of ethylene oxide onto the resultant polyoxypropylene adduct, and aii) from 60 to 90% by weight of one or more difunctional and/or trifunctional polyoxypropylene-polyoxyethylene-polyol containing from 60 to 85% by weight of oxyethylene units, of which up to 20% by weight are terminal, and having a hydroxyl number of from 20 to 80, the percentages by weight being based on the total weight of polymerized alkylene oxide units, particular preference being given to polyoxyalkylene-polyol mixtures (a) which contain, as synthesis component (aii), a polyoxypropylene-polyoxyethylene-polyol initiated using glycerol and containing from 70 to 80% by weight of oxyethylene units, of which from 2 to 15% by weight are terminal, and having a hydroxyl number of from 25 to 60, the percentages by weight being based on the total weight of polymerized alkylene oxide units.

b) It may be expedient, in order to modify the mechanical properties of the flexible, viscoelastic, structure-borne soundproofing, soft PU foams, to use low-molecular-weight chain extenders (b) for their preparation in addition to the polyoxyalkylenepolyol mixtures (a) which are necessary according to the invention. Suitable chain extenders of this type are polyfunctional compounds, in particular difunctional and trifunctional compounds, having molecular weights of from 18 to approximately 400, preferably from 62 to approximately 300. For example, dialkanolamines and/or trialkanolamines, eg. diethanolamine and triethanolamine, aliphatic diols and/or triols having from 2 to 6 carbon atoms in the alkylene, eg. ethanediol, 1,3-propanediol, 1,4-butanediol, 1,5-pentanediol, 1,6-hexanediol, 1,7-heptanediol, glycerol and/or trimethylolpropane, and low-molecular-weight ethoxylation and/or propoxylation products, prepared from the abovementioned dialkanolamines, trialkanolamines, diols and/or triols, and aliphatic and/or aromatic diamines, eg. 1,2-ethanediamine, 1,4-butanediamine, 1,6-hexanediamine, 2,3-, 2,4- and/or 2,6-tolylenediamine, 4,4'-diaminodiphenylmethane, 3,3'-di- and/or 3,3',5,5'-tetraalkyl-substituted 4,4'-diaminodiphenylmethanes as initiator molecules, and alkylene oxide or mixtures thereof. The chain extenders (b) advantageously employed are dialkanolamines, triols and/or preferably alkanediols, particular preference being given to diethanolamine, 1,2-ethanediol, 1,3-propanediol, 1,4-butanediol, 1,6-hexanediol and 1,7-heptanediol.

The chain extenders (b), in the presence of which the preparation of the soft PU foams is preferably carried out, are expediently used in amounts of from 1 to 60 parts by weight, preferably from 1 to 10 parts by weight, per 100 parts by weight of the polyoxyalkylene-polyol mixture.

c) The known organic, eg. aliphatic, cycloaliphatic, araliphatic, cycloaliphatic-aromatic and preferably aromatic, diisocyanates and/or polyisocyanates are suitable for the preparation of the flexible, viscoelastic, structure-borne soundproofing, soft PU foams. Specific examples of aromatic polyisocyanates are mixtures of 4,4'- and 2,4'-MDI, crude MDI containing 35% by weight or more, preferably from 50 to 90% by weight or more, of MDI isomers, based on the total weight of the mixture, 2,4- and 2,6-tolylene diisocyanate and the corresponding commercially available isomer mixtures, mixtures of tolylene diisocyanates and MDI and/or crude MDI, for example those having an MDI content of from 30 to 90% by weight, preferably from 40 to 80% by weight, based on the total weight of the crude MDI.

So-called modified polyvalentisocyanates, ie. products obtained by chemical reaction of organic diisocyanates and/or polyisocyanates, are also suitable. Examples are ester-, urea-, biuret-, allophanate-, isocyanurate- and preferably carbodiimide-, uretonimine- and/or urethane-containing diisocyanates and/or polyisocyanates. Specific examples are urethane-containing prepolymers having an NCO content of from 14 to 2.8% by weight, preferably from 12 to 3.5% by weight, or quasi-prepolymers having an NCO content of from 35 to 14% by weight, preferably from 34 to 22% by weight, where urethane-modified polyisocyanates made from tolylene diisocyanates have, in particular, an NCO content of from 34 to 28% by weight, and those made from 4,4'-MDI, 4,4'- and 2,4'-MDI isomer mixtures or crude MDI have, in particular, an NCO content of from 28 to 22% by weight, based on the total weight, and are prepared by reacting diols, oxyalkylene glycols and/or polyoxyalkylene glycols having molecular weights of from 62 to 6000, preferably from 134 to 4200, with tolylene diisocyanates, 4,4'-MDI, MDI isomer mixtures and/or crude MDI, for example at from 20° to 110° C., preferably from 50° to 90° C., examples of oxyalkylene glycols and polyoxyalkylene glycols, which may be employed individually or as mixtures, being diethylene glycol, dipropylene glycol, polyoxyethylene glycol, polyoxypropylene glycol and polyoxypropylene-polyoxyethylene glycol, carbodiimide- and/or isocyanurate-containing poly isocyanates, for example based on MDI isomers and/or tolylene diisocyanate.

However, mixtures of 4,4'- and 2,4'-MDI, crude MDI containing 35% by weight or more of MDI, based on the total weight, mixtures of 4,4'- and 2,4'-MDI and mixtures of 2,4- and 2,6-TDI, mixtures of crude MDI and mixtures of 2,4- and 2,6-TDI, urethane-containing polyisocyanate mixtures having an NCO content of from 28 to 14% by weight, based on the total weight, on the basis of MDI and/or crude MDI have proven particularly successful and are therefore preferred.

d) In order to accelerate the reaction of the polyoxyalkylene-polyol mixtures (a), water as the blowing agent (e) and, if desired, chain extenders (b) with the organic polyisocyanates and/or modified polyisocyanates (c), conventional polyurethane catalysts are introduced into the reaction mixture. Preference is given to basic polyurethane catalysts, for example tertiary amines, such as dimethylbenzylamine, dicyclohexylmethylamine, dimethylcyclohexylamine, N,N,N',N'-tetramethyl-diaminodiethyl ether, bis( dimethylaminopropyl ) urea, N-methyl- and N-ethylmorpholine, dimethylpiperazine, N-dimethylaminoethylpiperidine, 1,2-dimethylimidazole, 1-azabicyclo[2.2.0]octane, dimethylaminoethanol, 2-(N,N-dimethylaminoethoxy)ethanol, N,N',N'''-tris(dialkylaminoalkyl)-hexahydrotriazine, for example N,N',N'''-tris(dimethylaminopropyl)-s-hexahydrotriazine, and, in particular, triethylenediamine. However, metal salts, such as iron(II) chloride, zinc chloride, lead octanoate and preferably tin salts, such as tin dioctanoate, tin diethylhexanoate and dibutyl tin dilaurate, and, in particular, mixtures of tertiary amines and organic tin salts are also suitable. From 0.1 to 10% by weight, preferably from 0.3 to 3% by weight, of catalyst based on tertiary amines and/or from 0.01 to 0.5% by weight, preferably from 0.03 to 0.25% by weight, of metal salts, based on the weight of the polyoxyalkylene-polyol mixture (a) are expediently employed.

e) The blowing agents (e) which can be used for the preparation of the soft PU foams preferably include water, which reacts with isocyanate groups to form carbon dioxide. The amounts of water expediently employed are from 0.1 to 8 parts by weight, preferably from 1.5 to 5.0 parts by weight, in particular from 2.5 to 3.5 parts by weight, based on 100 parts by weight of the polyoxyalkylene-polyol mixture (a).

Physical blowing agents can also be employed in a mixture with water. Liquids which are inert toward the organic, modified or unmodified polyisocyanates (c) and have boiling points below 100° C., preferably below 50° C., in particular from −50° C. to 30° C., at atmospheric pressure, so that they evaporate under the influence of the exothermic polyaddition reaction, are suitable. Examples of preferred liquids of this type are hydrocarbons, such as n- and isopentane, in particular technical-grade mixtures of n- and isopentanes, n- and isobutane and propane, ethers, such as furan, dimethyl ether and diethyl ether, ketones, such as acetone and methyl ethyl ketone, alkyl carboxylates, such as methyl formate, dimethyl oxalate and ethyl acetate, and halogenated hydrocarbons, such as methylene chloride, dichloromonofluoromethane, trifluoromethane, difluoromethane, difluoroethane, tetrafluoroethane and heptafluoropropane. Mixtures of these low-boiling liquids with one another and/or with other substituted or unsubstituted hydrocarbons can also be used. In addition, organic carboxylic acids, eg. formic acid, acetic acid, oxalic acid, ricinolinic acid and other carboxyl-containing compounds are also suitable.

The amount of physical blowing agents necessary in addition to water can easily be determined depending on the foam density required and is from approximately 0 to 25 parts by weight, preferably from 0 to 15 parts by weight, per 100 parts by weight of the polyoxyalkylene-polyol mixture (a). It may be expedient to mix the modified or unmodified polyisocyanates (c) with the inert, physical blowing agent and thereby to reduce the viscosity.

f) It is also possible to add auxiliaries and/or additives (f) to the reaction mixture for the preparation of the soft PU foams. Specific examples are surface-active substances, foam stabilizers, cell regulators, fillers, dyes, pigments, flameproofing agents, hydrolysis-protection agents, and fungistatic and bacteriostatic substances.

Examples of suitable surface-active substances are compounds which serve to support homogenization of the starting materials and may also be suitable for regulating the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, eg. alkali metal salts or ammonium salts of dodecylbenzene- or dinaphthylmethanedisulfonic acid and ricinolinic acid; foam stabilizers, such as siloxane-oxyalkylene copolymers and other organopolysiloxanes, oxyethylated alkyl phenols, oxyethylated fatty alcohols, paraffin oils, castor oil esters, ricinolinic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups, and in particular copolymers having a K value of from 5 to 80, measured as a 0.5% strength by weight solution in isopropanol at 25° C., prepared in the presence of polymerization initiators by free-radical polymerization of A) from 20 to 80% by weight, based on the total weight of monomers (A) and (B), of one or more olefinically unsaturated polyoxyalkylene-alcohol adduct or polyester-alcohol adduct, B) from 80 to 20% by weight, based on the total weight of monomers (A) and (B), of one or more vinyl monomer selected from the group comprising N-vinylformamide, N-vinyl-2-pyrrolidone, N-vinyl-2-piperidone, N-vinyl-2-caprolactam, N-vinylimidazole, N-vinyl-2-ethyleneurea and N-vinyl-2-propyleneurea, C) from 0.05 to 40 parts by weight, based on 100 parts by weight, of monomers (A) and (B), of glycidyl acrylate, glycidyl methacrylate or mixtures thereof, D) from 0 to 10 parts by weight, based on 100 parts by weight of monomers (A) and (B), of one or more α,β-monoolefinically unsaturated acid, and E) from 0 to 30 parts by weight, based on 100 parts by weight of monomers (A) and (B), of one or more olefinically unsaturated carboxamide and-/or carboxylate and/or styrene.

Copolymers of the typementioned are described in DE-A-3,838,030.

The surface-active substances are usually used in amounts of from 0.01 to 5 parts by weight, based on 100 parts by weight of the polyoxyalkylene-polyols (a).

For the purposes of the invention, fillers, in particular reinforcing fillers, are conventional organic and inorganic fillers, reinforcing agents, weighting agents, agents for improving the abrasion behavior in paints, coating agents etc. Specific examples are inorganic fillers, such as silicate minerals, for example phyllosilicates, such as antigorite, serpentine, hornblends, amphiboles, chrysotile, zeolites and talc; metal oxides, such as kaolin, aluminum oxides, aluminum silicate, titanium oxides and iron oxides, metal salts, such as chalk, baryte and inorganic pigments, such as cadmium sulfide and zinc sulfide, and glass particles. Examples of suitable organic fillers are carbon black, melamine, collopbony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, or cyanuric acid derivatives, eg. melamine, or mixtures of two or more flameproofing agents, eg. ammonium polyphosphates and melamine, and also, if desired, starch in order to flameproof the soft PU foams prepared according to the invention. In general, it has proven expedient to use from 5 to 50 parts by weight, preferably from 5 to 25 parts by weight, of the flameproofing agents or mixtures mentioned per 100 parts by weight of components (a) to (c).

Further details on the other conventional auxiliaries and additives mentioned above can be obtained from the specialist literature, for example from the monograph by J. H. Saunders and K. C. Frisch "High Polymers" Volume XVI, Polyurethanes, Parts 1 and 2, Interscience Publishers, 1962 and 1964 respectively, or KunststoffHandbuch, Polyurethane, Volume VII, Carl-Hanser-Verlag, Munich, Vienna, 1st and 2nd edition, 1966 and 1983.

To prepare the soft PU foams, the organic, modified or unmodified polyisocyanates (c), the polyoxyalkylene-polyol mixtures (a) and, if desired, the chain extenders (b) are reacted in the presence of catalysts (d), blowing agents (e) and, if desired, auxiliaries and/or additives (f) at from 0 to 100° C., preferably from 15 to 80° C., in such mixing ratios that from 0.5 to 2, preferably from 0.8 to 1.6, in particular from about 1 to 1.25, reactive hydrogen atoms per NCO group are present bonded to starting components (a) and, if present, (b), and the molar ratio between the number of equivalents of water and the number of equivalents of NCO group is from 0.5 to 5:1, preferably from 0.7 to 0.95:1, in particular from 0.75 to 0.85:1.

The soft PU foams are expediently prepared by the one-shot process by mixing two components A and B, the starting components (a), (d), (e) and, if used, (b) and (f) being combined to form the so-called A component, and the B component being starting component (c), if desired mixed with (f) and inert, physical blowing agents. Since the A component has a shelf life of 6 months or more, it is only necessary to vigorously mix the A and B components before preparation for the soft PU foams. The reaction mixture can be foamed in open or closed molds; it is also suitable for the preparation of block foams.

The process according to the invention is also suitable for the production of soft PU foam moldings. To this end, the reaction mixture is introduced at from 15° to 80°, preferably from 30° to 65° C., into an expediently metallic, heatable mold. The mold temperature is usually from 20° to 90° C., preferably from 35° to 70° C. The reaction mixture is allowed to cure to completion in the closed mold with compaction, for example at a degree of compaction of from 1.1 to 8, preferably from 2 to 6, in particular from 2.2 to 4.

The flexible, soft PU foams prepared by the process according to the invention have densities of from 40 to 110 g/l, preferably from 65 to 90 g/l, in particular from 70 to 80 g/l, and are distinguished by low compressive strength, very good viscoelastic properties, in particular a loss factor in accordance with DIN 53 426 in the range from 0.7 to 1.5, while the other mechanical properties are also good.

The novel polyoxyalkylene-polyol mixtures, comprising the block polyoxypropylene-polyoxyethylenepolyol mixture (ai) and the difunctional and/or trifunctional polyoxypropylene/polyoxyethylene-polyol (aii), are suitable for the preparation of flexible, soft PU foams having viscoelastic, structure-borne soundproofing properties in a temperature range of from −20° C. to +80° C.

The flexible, soft PU foams and soft PU foam moldings produced by the process according to the invention are used in the domestic sector, for example for foam backings for carpets, providing sound absorption when walked on, as panelling elements and, in the automobile industry, as structure-borne soundproofing materials, for example for enclosing the engine compartment or for reducing internal noise in vehicles by means of top layers backed with these foams.

EXAMPLES

Preparation of the block polyoxypropylene-polyoxyethylene-polyol mixtures (ai)

EXAMPLE 1

2.2 parts by weight of glycerol were introduced into a reactor and mixed with 1.9 parts by weight of a 47% strength by weight aqueous potassium hydroxide solution. The water introduced and produced during the alcoholate formation was removed from the mixture under reduced pressure (0.1–0.01 bar) at 80° C. until (approximately 1 hour) the molar ratio in the mixture between glycerol in glycerolate form and water was 1:2 (mean functionality of the initiator molecule mixture 2.33). 188 parts by weight of 1,2-propylene oxide at 110° C. and a maximum pressure of 4.5 bar were subsequently fed in over a period of approximately 8 hours. When the addition of 1,2-propylene oxide was complete and after a post-reaction time of approximately 3 hours, the reaction mixture was stripped at 110° C. and 0.01 bar in order to remove the unreacted 1,2-propylene oxide.

12 parts by weight of ethylene oxide were then metered in at 105° C. and a maximum pressure of 5 bar over a period of 2 hours. When all the ethylene oxide had reacted, the reaction mixture was again stripped under the abovementioned reaction conditions in order to remove the unreacted ethylene oxide, subsequently neutralized using phosphoric acid and purified by conventional methods.

A block polyoxypropylene-polyoxyethylene-polyol mixture having a hydroxyl number of 30 and containing 5% by weight of terminal ethylene oxide groups, based on the weight of the polymerized 1,2-propylene oxide units, was obtained.

EXAMPLE 2

The procedure was similar to that of Example 1, but the water introduced with the potassium hydroxide solution and formed during the alcoholate formation was removed by distillation in such an amount that the reaction mixture contained glycerol in glycerolate form and water in the molar ratio 2:1 (mean functionality of the initiator molecule mixture 2.66).

A block polyoxypropylene-polyoxyethylene-polyol mixture having a hydroxyl number of 30 and containing 5% by weight, based on the weight of the polymerized 1,2-propylene oxide units, of terminal ethylene oxide units was obtained. Preparation of soft PU foams

EXAMPLE 3

A Components Mixture comprising 72.8 parts by weight of a polyoxypropylene-polyoxyethylene-polyol initiated using Glycin and containing 75% by weight of oxyethylene units, based on the total weight of polymerized 1,2-propylene oxide and ethylene oxide units, of which 5% by weight are in the form of a terminal block and the remainder are bonded internally and randomly, 18.7 parts by weight of a block polyoxypropylene-polyoxyethylene-polyol mixture prepared as in Example 1, 2.8 parts by weight of ethylene glycol, 2.6 parts by weight of water, 0.5 part by weight of a 33% strength by weight solution of triethylenediamine in dipropylene glycol, 0.3 part by weight of 2-(N,N-dimethylaminoethoxy)ethanol, 0.2 part by weight of a 70% strength by weight solution of bis(N,N-dimethylaminoethyl) ether in dipropylene glycol, 0.1 part by weight of pentamethyldiethylenetriamine, 1.0 part by weight of a silicone-based foam stabilizer (Tegostab ®B 8418 from Goldschmidt AG, Essen) and 1.0 part by weight of a copolymer based on N-vinylpyrrolidone, vinyl acetate and an acrylate-containing polyoxyalkylene glycol ester (commercial product Tone ® TM 100 acrylate from Union Carbide Corp.) having a K value of 20, prepared in accordance with the teaching of DE-A-3,838,030, as emulsifier.

B Component: Crude MDI having an NCO content of 31.3% by weight and containing 39% by weight of MDI isomers.

100 parts by weight of the A component and 59 parts by weight of the B component, corresponding to an NCO index of 95, were mixed vigorously at 23° C. for 8 seconds.

1200 g of the resultant reaction mixture were transferred into a metallic mold with internal dimensions 40×40×10 cm held at a temperature at 50° C., the mold was closed, and the reaction mixture was allowed to foam up.

After a mold residence time of 3 minutes, the viscoelastic molding formed was removed from the mold. It had a density, measured in accordance with DIN 53 420, of 70 g/l and a modulus of elasticity, measured in accordance with DIN 53 426, of 9.3 N/cm$^2$ and a loss factor of 1.04.

EXAMPLE 4

A Component: Analogous to Example 3

B Component: Urethane-containing polyisocyanate mixture having an NCO content of 28.1% by weight, prepared by reacting crude MDI having an MDI content of 60% by weight with a polyoxypropylene glycol having a molecular weight of 400.

100 parts by weight of the A component and 60 parts by weight of the B component, corresponding to an NCO index of 90, were foamed by a method similar to that of Example 3.

After a mold residence time of 3 minutes, the viscoelastic molding formed was removed from the mold. The molding had a density of 72 g/l and a modulus of elasticity, measured in accordance with DIN 53 426, of 11.5 N/cm$^2$ and a loss factor of 1.41.

In addition, the following mechanical properties were determined on the moldings produced as in Examples 3 and 4.

| Examples | 3 | 4 |
| --- | --- | --- |
| Tensile strength in accordance with DIN 53 571 [kPa] | 158 | 198 |
| Elongation in accordance with DIN 53 571 [%] | 0.57 | 0.65 |
| Tear propagation strength in accordance with DIN 53 575 [N/mm] | 174 | 165 |
| Compressive set in accordance with DIN 53 572 [%] | <1 | <1 |

EXAMPLES 5 TO 8

The procedure was similar to that of Example 3, but the 2.8 parts by weight of ethylene glycol were replaced as chain extender by 6 parts by weight of 1,3-propanediol in Example 5,
6 parts by weight of 1,4-butanediol in Example 6,
6 parts by weight of 1,6-hexanediol in Example 7, and
6 parts by weight of 1,7-heptanediol in Example 8.

The following mechanical and acoustic properties were determined on the PU moldings obtained.

| Example | 5 | 6 | 7 | 8 |
| --- | --- | --- | --- | --- |
| Density in accordance with DIN 53 420 [g/liter] | 77 | 74 | 73 | 70 |
| Modulus of elasticity in accordance with DIN 53 426 [N/cm$^2$] | 11.2 | 12.9 | 19.2 | 13.9 |
| Loss factor in accordance with DIN 53 426 | 0.73 | 1.03 | 0.92 | 0.96 |
| Compressive set in accordance with DIN 53 572 [%] | 1.5 | 1.5 | 0.8 | 0.8 |

We claim:

1. A process for the preparation of flexible, soft polyurethane foams having viscoelastic, structure-borne, soundproofing properties in a temperature range of from $-20°$ C. to $+80°$ C., comprising reacting A) a polyoxyalkylene-polyol which has a functionality of two or more and
B) organic polyisocyanates; organic polyisocyanates modified with ester, urea, biuret, allophanate, isocyanurate, carbodiimide, uretonimide, and urethane groups; or mixtures of said organic polyisocyanates and organic polyisocyanates modified with said groups, in the presence of
C) catalysts, and,
D) blowing agents, where the polyoxyalkylene-polyol (A) comprises a mixture of i) a block polyoxypropylene-polyoxyethylene-polyol mixture having a hydroxyl number of from 14 to 65 and containing from 2 to 9% by weight of terminal ethylene oxide units, based on the weight of the polyoxypropylene units, and prepared by artionic polymerization, at elevated temperature, of 1,2-propylene oxide onto an initiator molecular mixture, having a mean functionality of from 2.3 to 2.8, of water and glycerol, or water and trimethylopropane, or water and glycerol and trimethylolpropane, and polymerization of ethylene oxide onto the resultant polyoxypropylene adduct, and
ii) one or more difunctional and optionally trifunctional polyoxypropylenepolyoxyethylene-polyol containing from 60 to 85% by weight of oxyethylene units, based on the total weight of polymerized alkylene oxide units, and having a hydroxyl number of from 20 to 80.

2. A multistep process for the preparation of a flexible, soft polyurethane foam having viscoelastic, structure-borne soundproofing properties in a temperature range from $-20°$ C. to $+80°$ C., comprising A) in the first reaction step, 1,2-propylene oxide is polymerized onto an initiator molecule mixture, having a mean functionality of from 2.3 to 2.8, of water and glycerol, or water and trimethylolpropane, or water and glycerol and trimethylolpropane, in the presence of one or more basic catalyst at elevated temperature, and ethylene oxide is polymerized onto the resultant polyoxypropylene adduct in such an amount that the resultant block polyoxypropylene-polyoxyethylene-polyol mixture has a hydroxyl number of from 14 to 65 and contains from 2 to 9% by weight of terminal ethylene oxide units, based on the weight of the polyoxypropylene units,
B) in the second reaction step,
   i) the resultant block polyoxypropylene-polyoxyethylene-polyol mixture (A) is mixed with
   ii) one or more difunctional and optionally trifunctional polyoxypropylene-polyoxyethylene-polyol containing from 60 to 85% by weight of oxyethylene units, based on the total weight of polymerized alkylene oxide units, and having a hydroxyl number of from 20 to about 80, and
C) in the third reaction step, the resultant mixture is reacted with
   i) an organic polyisocyanate; an organic polyisocyanate modified with ester, urea, biuret, allophanate, isocyanurate, carbodiimide, uretonimine, and urethane groups; and mixtures of said organic polyisocyanate and said modified organic polyisocyanate, in the presence of
   ii) catalysts, and
   iii) blowing agent.

3. A process as claimed in claim 1 or 2, wherein the block polyoxypropylene-polyoxythylene-polyol mixture has a hydroxyl number of from 14 to 40 and contains from 3 to 8% by weight of terminal ethylene oxide units, based on the weight of the polyoxypropylene units.

4. A process as claimed in claim 1 or 2, wherein the initiator molecule mixture for the preparation of the block polyoxypropylene-polyoxyethylene-polyol mixtures comprises a molar ratio of water to glycerol, trimethylopropane, or a mixture of glycerol and trimethylolpropane of from 2.3:1 to 1:4.

5. A process as claimed in claim 1 or 2 wherein the initiator molecule mixture for the preparation of the block polyoxypropylene-polyoxyethylene-polyol mixture comprises a water/glycerol mixture in the molar ratio from 2.3:1 to 1:4.

6. A process as claimed in claim 1 or 2, wherein the polyoxyproplyene-polyoxyethylene-polyol used is a polyoxypropylene-polyoxyethylene-polyol initiated using glycerol and containing a total of from 70 to 80% by weight of oxyethylene units, of which up to 20% by weight are terminal, and having a hydroxyl number of from 25 to 60, the percentages by weight being based on the total weight of polymerized alkylene oxide units.

7. A process as claimed in claim 1, wherein the polyoxyalkylene-polyol (A) which has a functionality of two or more consists essentially of a mixture which contains, based on the total of weight of said mixture,
  A) from 10 to 90% by weight of a block polyoxypropylene-polyoxyethylene-polyol mixture having a hydroxyl number of from 14 to 40 and containing from 3 to 8% by weight of terminal ethylene oxide units, based on the weight of the polyoxypropylene units, and prepared by anionic polymerization, at elevated temperature, of 1,2-propylene oxide onto an initiator molecule mixture, having a mean functionality of from 2.3 to 2.8, of water and glycerol, or water and trimethylolpropane, or water and glycerol and trimethylolpropane, and polymerization of ethylene oxide onto the resultant polyoxypropylene adduct, and
  B) from 10 to 90% by weight of one or more difunctional and optionally trifunctional polyoxypropylene-polyoxyethylene-polyol containing from 60 to 85% by weight of oxyethylene units, based on the total weight of polymerized alkylene oxide units, and having a hydroxyl number of from 20 to 80.

8. A process as claimed in claim 1 or 2, wherein the organic polyisocyanate comprises: a mixture of 4,4'- and 2,4'-diphenylmethane diisocyanates, a mixture of diphenylmethane diisocyanates and polyphenylene-polymethylene polyisocyanates containing 35% by weight of more of diphenylmethane diisocyanates, based on the total weight, a mixture of 4,4'- and 2,4'-diphenylmethane diisocyanate and a mixture of 2,4- and 2,6-toluene diisocyanate, a mixture of diphenylmethane diisocyanates and polyphenyl-polymethylene polyisocyanates, a urethane-containing polyisocyanate mixture having an NCO content of from 28 to 14% by weight, based on the total weight, on the basis of diphenylmethane diisocyanates or a mixture of diphenylmethane diisocyanates and polyphenyl-polymethylene polyisocyanates.

9. A process as claimed in claim 1 or 2, wherein the blowing agent comprises water in an amount of from 0.1 to 8 parts by weight, based on 100 parts by weight of the polyoxyalkylenepolyol.

10. A process as claimed in claim 1 or 2, further having an emulsifier as an additive, comprising, a copolymer having a K value of from 5 to 80, measured as a 0.5% strength by weight solution in isopropanol at 25° C. prepared in the presence of a polymerization initiator by free-radical polymerization of
  A) from 20 to 80% by weight, based on the total weight of monomers (A) and (B), of one or more olefinically unsaturated polyoxyalkylene-alcohol adduct or polyester-alcohol adduct,
  B) from 80 to 20% by weight, based on the total weight of monomers (A) and (B), of one or more vinyl monomer selected from the group comprising N-vinylformamide, N-vinyl-2-pyrrolidone, N-vinyl-2-piperidone, N-vinyl-2-caprolactum, N-vinylimidazole, N-vinyl-2-ethyleneurea and N-vinyl-2-propyleneurea,
  C) from 0.05 to 40 parts by weight, based on 100 parts by weight, of monomers (A) and (B), of glycidyl acrylate, glycidyl methacrylate or mixtures thereof,
  D) from 0 to 10 parts by weight, of one or more $\alpha,\beta$-monoolefinically unsaturated acid, and
  E) from 0 to 30 parts by weight, based on 100 parts by weight of monomers (A) and (B), of one or more olefinically unsaturated carboxamides, carboxylates, styrene and mixtures thereof.

11. A polyoxyalkylene-polyol mixture comprising, based on the total weight of polyoxalkylene-polyols,
  A) from 10 to 40% by weight of a block polyoxypropylene-polyoxyethylene-polyol mixture having a hydroxyl number of from 14 to 40 and containing from 3 to 8% by weight of terminal ethylene oxide units, based on the weight of the polyoxypropylene units, and prepared by anionic polymerization, at elevated temperature, of 1,2-propylene oxide onto an initiator molecule mixture, having a mean functionality of from 2.3 to 2.7, of water and glycerol, and polymerization of ethylene oxide onto the resultant polyoxypropylene adduct, and
  B) from 60 to 90% by weight of one or more difunctional and optionally trifunctional polyoxypropylene-polyoxyethylene-polyol containing from 60 to 85% by weight of oxyethylene units, of which up to 20% by weight are terminal, and having a hydroxyl number of from 20 to 80, the percentages by weight being based on the total weight of polymerized alkylene oxide units.

12. A novel polyoxyalkylene-polyol mixture as claimed in claim 11, wherein the mixture contains, as the polyoxypropylene-polyoxyethylene-polyol (B), a polyoxypropylene-polyoxyethylene-polyol initiated using glycerol and containing from 70 to 80% by weight of oxyethylene units, of which from 2 to 15% by weight are terminal, and having a hydroxyl number of from 25 to 60, the percentages by weight being based on the total weight of polymerized alkylene oxide units.

13. A process as claimed in claim 2, wherein the mixture of block polyoxypropylenepolyoxyethylene-polyol mixture and the one or more difunctional and optionally trifunctional polyoxypropylene-polyoxyethylene-polyol consists essentially of, based on the total weight of polyoxyalkylene polyols,
  A) from 10 to 90% by weight of a block polyoxypropylene-polyoxyethylene-polyol mixture having a hydroxyl number of from 14 to 40 and containing from 3 to 8% by weight of terminal ethylene oxide units, based on the weight of the polyoxypropylene units, and prepared by anionic polymerization, at elevated temperature, of 1,2-propylene oxide onto an initiator molecule mixture, having a mean functionality of from 2.3 to 2.8, of water and glycerol, or water and trimethylolpropane, or water and glycerol and trimethylolpropane, and polymerization of ethylene oxide onto the resultant polyoxypropylene adduct, and B) from 10 to 90% by weight of one or more difunctional and optionally trifunctional polyoxypropylene-polyoxyethylene-polyol containing from 60 to 85% by weight of oxyethylene units, based on the total weight of polymerized alkylene oxide units, and having a hydroxyl number of from 20 to 80.

14. The process of claim 13, further comprising a chain extender.

15. The process of claim 14, consisting of said mixture of block polyoxypropylene-polyoxyethylene-polyol mixture and the one or more difunctional optionally trifunctional polyoxypropylene-polyoxyethylene-polyol.

16. The process of claim 7, wherein the polyoxyalkylene-polyol which has a functionality of two or more consists of said mixture of 10 to 90% of said block polyoxypropylene-polyoxyethylene-polyol mixture or 10 to 90% of said difunctional and optionally trifunctional polyoxypropylene-polyether-polyol.

17. The process of claim 16, further comprising a low-molecular-weight chain extender.

18. The process of claim 1, wherein the blowing agent consists of water.

19. The process of claim 2, wherein the blowing agent consists of water.

* * * * *